United States Patent
Bergmann et al.

(10) Patent No.: US 8,993,150 B2
(45) Date of Patent: Mar. 31, 2015

(54) BATTERY HAVING PASSIVE CORROSION PROTECTION

(75) Inventors: Sven Bergmann, Stuttgart (DE); Michael Schiemann, Berlin (DE); Peter Birke, Glienicke/Nordbahn (DE); Hans-Georg Schweiger, Ingolstadt (DE); Michael Keller, Berlin (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 13/703,423

(22) PCT Filed: Jun. 8, 2011

(86) PCT No.: PCT/EP2011/059513
§ 371 (c)(1),
(2), (4) Date: Dec. 20, 2012

(87) PCT Pub. No.: WO2011/154456
PCT Pub. Date: Dec. 15, 2011

(65) Prior Publication Data
US 2013/0095354 A1    Apr. 18, 2013

(30) Foreign Application Priority Data
Jun. 11, 2010    (DE) .......................... 10 2010 029 970

(51) Int. Cl.
| | |
|---|---|
| H01M 6/42 | (2006.01) |
| H01M 2/02 | (2006.01) |
| H01M 2/20 | (2006.01) |
| H01M 2/32 | (2006.01) |
| H01M 10/0525 | (2010.01) |

(52) U.S. Cl.
CPC ................ *H01M 2/32* (2013.01); *H01M 2/202* (2013.01); *H01M 10/0525* (2013.01); *Y02E 60/122* (2013.01); *Y02T 10/7011* (2013.01)
USPC ........................................... 429/158; 429/178

(58) Field of Classification Search
None
See application file for complete search history.

(56) References Cited

U.S. PATENT DOCUMENTS

| | | | |
|---|---|---|---|
| 4,156,552 A | 5/1979 | Wilson et al. | |
| 5,721,056 A | 2/1998 | Wessling | |
| 5,985,480 A | 11/1999 | Sato et al. | |
| 6,841,298 B2 | 1/2005 | Yamashita et al. | |
| 2003/0031923 A1* | 2/2003 | Aoshima et al. | 429/127 |
| 2003/0031926 A1* | 2/2003 | Farmer et al. | 429/176 |
| 2004/0224225 A1* | 11/2004 | Yamashita et al. | 429/181 |
| 2007/0009790 A1* | 1/2007 | Vutetakis et al. | 429/160 |
| 2007/0152235 A1 | 7/2007 | Hosoya | |
| 2008/0124617 A1* | 5/2008 | Bjork | 429/90 |

(Continued)

FOREIGN PATENT DOCUMENTS

| | | |
|---|---|---|
| EP | 0825658 A2 | 2/1998 |
| EP | 1276161 A1 | 1/2003 |

(Continued)

*Primary Examiner* — Cynthia K. Walls
(74) *Attorney, Agent, or Firm* — Laurence A. Greenberg; Werner H. Stemer; Ralph E. Locher (57) ABSTRACT

A battery has two or more individual cells that are connected in series and which, for contacting purposes, each has at least one contact electrode to the positive electrode (cathode) and at least one contact electrode to the negative electrode (anode). The two are made of metals that differ from each other. The contact electrodes to the anode and the cathode have passive corrosion protection at least in the respective contacting region of the contact electrodes.

16 Claims, 5 Drawing Sheets

(56) References Cited

U.S. PATENT DOCUMENTS

| | | |
|---|---|---|
| 2008/0131765 A1* | 6/2008 | Imanaga et al. ............. 429/160 |
| 2009/0297939 A1 | 12/2009 | Yoon |
| 2010/0040950 A1* | 2/2010 | Buiel et al. ................... 429/211 |
| 2011/0020694 A1* | 1/2011 | Khakhalev et al. ........... 429/158 |
| 2011/0081568 A1* | 4/2011 | Kim et al. ..................... 429/158 |
| 2011/0117420 A1* | 5/2011 | Kim et al. ..................... 429/158 |
| 2011/0256445 A1* | 10/2011 | Kim et al. ..................... 429/158 |
| 2011/0293995 A1* | 12/2011 | Sasaki et al. ................. 429/158 |
| 2011/0305945 A1* | 12/2011 | Tada et al. .................... 429/179 |

FOREIGN PATENT DOCUMENTS

| | | |
|---|---|---|
| EP | 1737057 A1 | 12/2006 |
| JP | 2006344572 A | 12/2006 |
| WO | 9500678 A1 | 1/1995 |
| WO | 02101849 A2 | 12/2002 |
| WO | 2006109610 A1 | 10/2006 |

* cited by examiner

BATTERY HAVING PASSIVE CORROSION PROTECTION

BACKGROUND OF THE INVENTION

Field of the Invention

The present invention relates to a battery, in particular a lithium ion battery, which comprises at least two individual cells, in particular individual lithium ion cells, interconnected in series, the battery having passive corrosion protection in the region of the interconnection, i.e. in the region of the contacting of the outer discharge conductor of the positive discharge electrode (also referred to as the cathode) of one individual cell with the outer discharge conductor of the negative discharge electrode (also referred to as the anode) of another individual cell, at least in the region of the contacting.

The term hybrid or electrical vehicle refers to vehicles which by design can be powered fully or partially by electrical energy.

Motor vehicles with a hybrid drive, also referred to as hybrid vehicles, have for example an internal combustion engine, an electrical machine and one or more electrical energy storage devices. Electrical vehicles having fuel cells generally consist of a fuel cell for energy conversion, a tank for liquid or gaseous fuel, an electrochemical energy storage device and an electrical machine for the propulsion.

The electrical machine of the hybrid vehicle is generally configured as a starter/generator and/or electrical drive. As a starter/generator, it replaces the starter and generator normally provided. In an embodiment as an electrical drive, an additional torque, i.e. acceleration moment, can be contributed by the electrical machine to the powertrain of the vehicle. As a generator, it allows recovery of braking energy and support of the vehicle electrical system. In a pure electrical vehicle, the drive power is provided only by an electrical machine. A feature common to the hybrid and electrical vehicle types is that a large amount of electrical energy needs to be provided and transferred.

The energy flow is controlled by means of electronics, generally referred to as a hybrid controller. Inter alia, it regulates whether and to what extent energy should be drawn from or delivered to the energy storage device.

The drawing of energy from the fuel cell or the energy storage device is generally used to constitute drive power or to supply the vehicle electrical system. The delivery of energy is used to charge the storage device, or to convert braking energy into electrical energy, i.e. for regenerative braking.

The energy storage device for hybrid applications can be recharged during driving. The energy required for this is provided by the internal combustion engine.

For example, lead batteries, double-layer capacitors, nickel metal hydride cells, nickel zinc cells or lithium ion cells may be used as energy sources and storage devices for electrical vehicle applications.

The lithium ion cell is in most cases accommodated in a gastight metal housing. One special possibility for the embodiment with lithium ion cells is in the form of a softpack. This consists of a battery cell which is enclosed by a sheet, typically composite aluminum sheet packaging. Discharge conductors are fed out of the cells in different possible embodiments (see FIGS. 1a) and 1b)).

Figure 1A:
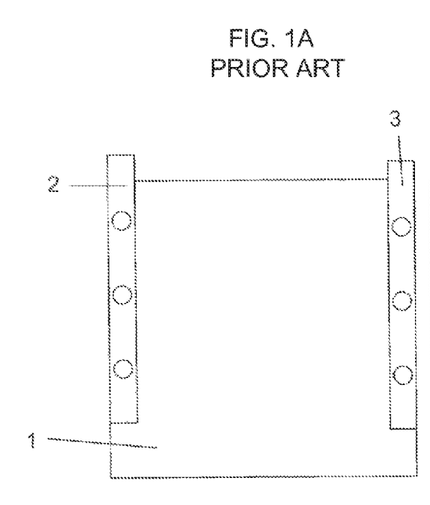
FIGS. 1a and 1b show a conventional individual lithium ion cell with outer discharge conductors.
Figure 1B:
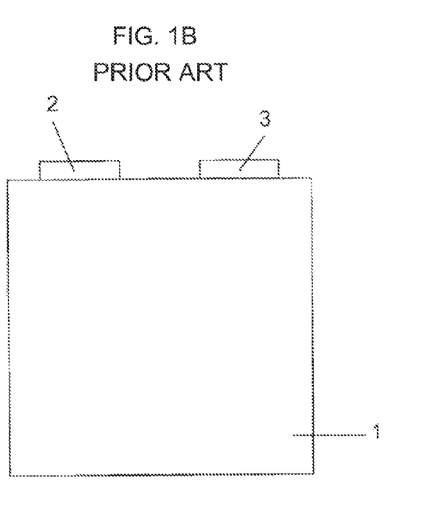

FIG. 1a) represents a conventional individual lithium ion cell 1 in which the outer discharge conductors, i.e. the positive discharge conductor (of the cathode) 2 and the negative discharge conductor (of the anode) 3 are applied externally on the edge of the individual cell 1. The outer discharge conductors 2 and 3 in this case pass through the outer shell of the individual cell 1 and, in the cell, contact the electrode regions required for the current discharge (the cathode or the anode, respectively) in the individual cell 1.

FIG. 1b) represents an alternative concept of such an individual cell 1, in which the discharge conductors 2 and 3 are applied on one side of the individual cell 1 and protrude from the individual cell 1.

The discharge conductors of the lithium ion cells, irrespective of the housing design, are constructed from different materials (metals) having correspondingly different electrochemical potentials as compared with other battery types. Thus, the discharge conductors at the positive pole (cathode) generally consist of aluminum and the discharge conductors at the negative pole (anode) generally consist of copper. In contrast to this, the discharge conductors for example in the case of lead acid cells respectively consist of lead and in the case of nickel-cadmium and nickel-zinc cells respectively of stainless steel having an identical electrochemical potential. Owing to the different discharge conductor materials in the case of lithium ion cells, with series interconnection of the cells and the resulting contact of the materials having a different electrochemical potential, corrosion of the discharge conductors at the contact point takes place under certain circumstances. This type of corrosion is generally referred to as contact corrosion. This is a very substantial difference from other electrochemical cells, in which identical materials (metals) are respectively contacted.

Contact corrosion can occur when different metals, i.e. metals having a different electrochemical potential (measured for example against the standard platinum-hydrogen electrode) come in contact with one another. As already described, this contact can occur in the storage device with series connection of lithium ion cells to one another, the negative discharge conductors of which generally consist of (nickelized) copper (potential +0.34 V) and the positive discharge conductors of which generally consist of aluminum (potential −1.66 V).

The less reactive metal (copper) having the higher electrochemical potential then under certain circumstances (presence of a medium which functions as an electrolyte) promotes corrosion in the reactive metal (aluminum) having the lower electrochemical potential by contact corrosion, since the two metals act as an anode and cathode and a weak current therefore flows between the two discharge conductors. A precondition for this process is, as already mentioned, a suitable additional material at the contact point of the two metals, for example water formed by air condensation. However, even the quite normal air humidity, which is always present for example in a closed storage device, may be sufficient.

Figure 2A:
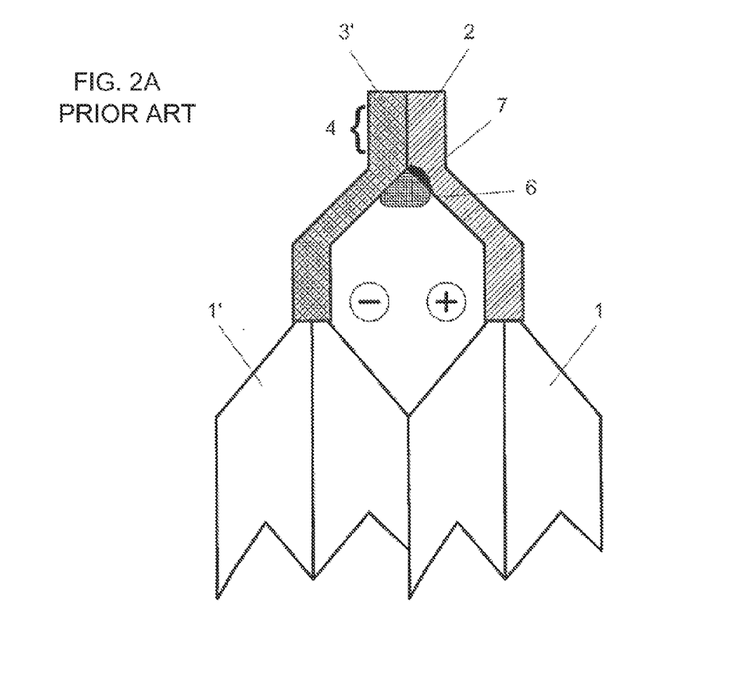
FIGS. 2a and 2b are partial sectional views illustrating the problem of series interconnection of two lithium ion cells.
Figure 2B:
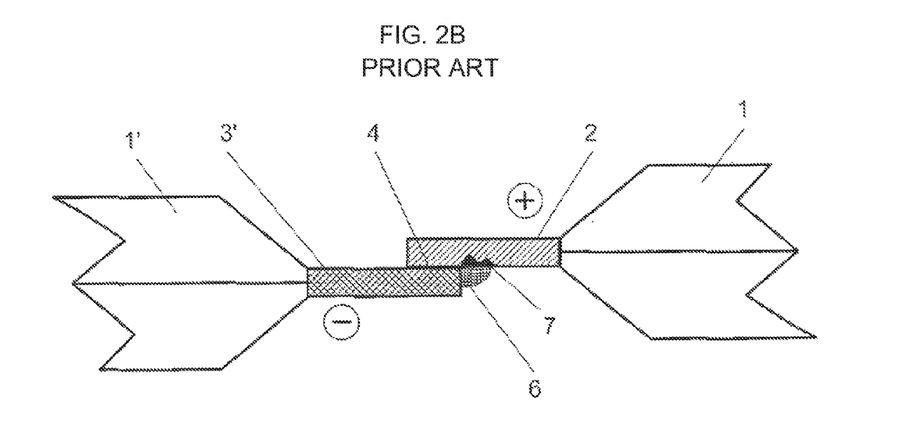

The corrosion problem for series interconnection of two lithium ion cells is represented in FIG. 2. Here, two individual cells 1 and 1' arranged parallel with one another are represented, the discharge conductors of the cells respectively being interconnected in pairs. By way of example, the discharge conductor (at the positive electrode-cathode) 2 of the first individual cell 1 and the discharge conductor (at the negative electrode-anode) 3' of the second individual cell 1' are represented. The two discharge conductors of the two cells 1 and 1' are electrically conductively contacted with one another in a region 4. For the case in which water and/or salt solutions 6 have condensed, or are present, in the region of the contacting 4, corrosions 7 (here of the working electrode 2) can occur. An alternative configuration of the contacting, or the spatial arrangement, of two cells 1 and 1' is represented in FIG. 2b), according to which the individual cells 1 and 1' are arranged not parallel with one another but opposite. Here again, series interconnection can take place in the region of the contacting 4 of the two contacted discharge conductors (an aluminum discharge conductor 2 as the positive discharge conductor of the first individual cell 1 and a copper discharge conductor 3' as the negative discharge conductor of the second individual cell 1' are represented), for the case in which the arrangement of the individual cells is wetted with moisture (electrolyte) 6 in the region of the contacting 4. Corrosions 7 occur.

In general, the aluminum discharge conductor of the cell is oxidized and dissolves. The reactions also depend on the pH and the oxygen concentration.

The following reactions take place during the corrosion:

Reaction at the Positive Discharge Conductor of the Cell, Consisting of Aluminum:

$$Me_{reactive} \rightarrow Me_{reactive}^+ + e^-$$

Reaction at the Negative Discharge Conductor of the Cell, Consisting of Copper:

$$Me_{unreactive}^+ + e^- \rightarrow Me_{unreactive}$$

If metal ions are present

In an acidic electrolyte (pH<5) hydrogen is formed:

$$2H^+ + 2e^- \rightarrow H_2$$

In an acidic electrolyte, water is formed when oxygen is present:

$$O_2 + 4H^+ + 4e^- \rightarrow 2H_2O$$

In an alkaline medium (pH>7), water reacts to form hydroxide:

$$2H_2O + 2e^- \rightarrow H_2 + 2OH^-$$

Corrosion elements differ in the structure of the corrosion components, i.e. partners participating in the corrosion, which function as the anode, cathode and electrolyte. A feature common to them is the electrical arrangement: the anode and cathode are electrically conductively connected to one another both by the electrolyte (water or condensate in the battery) and by direct contact (conductive connection, for example welding of the cell connectors to one another).

Without corrosion protection, inter alia at pores (for example connection gaps in the conductive connection), under certain circumstances enhanced corrosion (so-called crevice corrosion) takes place. The crevice corrosion is initiated as a result of the creation of concentration gradients between the electrolyte inside and outside the gap. Owing to its geometry, the gap in this case provides the preconditions in the form of impeding the diffusion equilibrium, so that a concentration element can form.

When corrosion attack on the cell discharge conductors leads to impairment of the functionality, this is referred to as corrosion damage. In the event of corrosion damage, the operational reliability of the storage device can be compromised and the total power of the battery can be significantly reduced.

Corrosion protection describes measures for avoiding damage which can be caused by corrosion on metallic components, here discharge conductors.

In the case of corrosion protection, a distinction is made between active and passive corrosion protection.

In active corrosion protection, "more reactive" layers having a lower electrochemical potential protect the metal to be protected and in this case function as a sacrificial or protective covering. This means that the layer preferentially dissolves and therefore preserves for as long as possible the function of the discharge conductor to be protected. A classical example is the zinc coating of steel. Since the corrosion products could have an unfavorable effect on the overall functionality of the energy storage device, however, such a corrosion protection principle is associated with significant disadvantages for lithium ion accumulators.

On the basis of this, it is an object of the present invention to produce an alternative corrosion protection concept for batteries, in particular for lithium ion cells or batteries, which permits a long lifetime of the batteries (above all based on lithium ion cells) and at the same time does not compromise the functionality of the batteries throughout the lifetime.

This object is achieved by the features of the claims.

According to the invention, a battery is therefore provided comprising at least two individual cells which are interconnected in series and each of which has, for contacting, at least one discharge conductor connected to the cathode and at least one discharge conductor connected to the anode of the respective individual cell, wherein the discharge conductors connected to the cathode and the anode of the individual cell consist of different metals and the discharge conductors (for the anode and cathode) each have passive corrosion protection at least in the region of the contacting of the discharge conductors.

In particular, the individual cells are cells in which Li ions are incorporated at interstitial sites in the active material of the electrodes, i.e. individual lithium ion cells. The invention therefore preferably relates to a lithium ion battery which is formed by a multiplicity of interconnected individual lithium ion cells.

Since absolute corrosion resistance can only be achieved with difficulty, the protective measures implemented for the cell discharge conductors in the context of the invention are generally intended to reduce the rate of the corrosive attack to such an extent that no damage occurs over the lifetime, or correspondingly the medium acting as an electrolyte is prevented from contact with the discharge conductors. In this way, damage to the connection contact is intended to be avoided during the lifetime.

In a preferred embodiment, the passive corrosion protection is configured in the form of an attached component, in particular as a clip, which is formed from a nonmetallic material, as a covering consisting of a nonmetallic material and/or as a conversion layer.

Passive corrosion on the cells is preferably achieved by a suitable covering of the discharge conductors (as explained below in the exemplary embodiments) in order to avoid contact with corroding media (for example electrolyte as condensation water). In principle, all materials which adhere well to the metals of the discharge conductors and repel water are suitable as a covering. The bond between the coverings and the discharge conductors may in this case be physical and/or chemical in nature. For example, a coating, rubber, plastic clips comprising an adhesive or conversion layers (conversion layers are very thin nonmetallic, usually inorganic layers on a metal surface, which are generally produced by chemical reaction of an aqueous treatment solution with the metallic substrate), an eloxal layer, a hard eloxal layer, chromatization or other conversion layers with a substantially nonmetallic character. The term refers to conversion layers protective layers which are artificially formed when the corrosion-protection effect of "natural" passive layers is insufficient in the case of many metals. On the other hand, the "natural" corrosion layers generally do not form a sufficient adhesion base for subsequent functional layers. For this reason, "natural" corrosion layers must be removed and instead of them "artificial" protective layers—conversion layers—must be generated by means of chemical or electrochemical treatment, for example phosphate layers or blackening layers, or anodization layers.

This is done, for example, in aqueous "corrosion media" (phosphatization/anodization electrolyte inter alia) in two basic steps:
a) oxidation of the metal surface
b) reaction of the metal ions with constituents of the treatment solution, with
formation of new top layers, for example:
   firmly adhering Al oxides in the case of eloxal or Fe oxides in the case of blackening
   metal phosphates in the case of phosphatization.

Passive corrosion protection has the advantage that, with absolute leaktightness of the aforementioned layers, the lifetime of such a lithium ion battery is no longer determined by the corrosion of the electrodes, since effective corrosion protection can be maintained throughout the lifetime of the battery.

Preferred materials, which may be envisioned both for the attached component and for the covering, are in this case selected from the group consisting of coatings, rubber or plastics.

As conversion layers, eloxal layers, hard eloxal layers, chromatizations, phosphate layers, blackening layers and/or anodization layers may in particular be envisioned.

It is furthermore preferred in this case for the passive corrosion protection to be applied directly (for example by clipping, pressing, mechanical fixing) onto the discharge conductors of the anode and cathode, or onto the discharge conductors of the anode and cathode by means of an adhesive layer. In the embodiment mentioned last, it is thus possible for there also to be an adhesive layer, for example an encapsulation layer, between the respective electrode and the corrosion protection, which bonds the corrosion protection and the respective electrode. Preferred adhesives are in this case selected from the group consisting of universal adhesives, two-component adhesives, physically bonding adhesives (wet-tack adhesives containing solvent), chemically curing adhesives (epoxy resin adhesives, silicones, cyanoacrylate adhesives) or pressure-sensitive adhesives.

It is likewise possible for the passive corrosion protection to be formed as a coating, and at least in the region of the contacting of the discharge conductors. The coating may, for example, be formed from protective, epoxy-resin, polyurethane-resin and/or butyl- and/or silicon-rubber coatings.

In another preferred embodiment, the passive corrosion protection is applied onto discharge conductors of the anode and the cathode in a hermetically sealing fashion.

It is furthermore possible for the passive corrosion protection to be formed over the entirety of the discharge conductors, i.e. over the entire surface of the working electrodes, or only in the region of the contacting.

According to these two embodiments, for example, the complete surface of the respective discharge conductors is therefore covered with passive corrosion protection. As an alternative to this, however, it is also conceivable to apply corrosion protection only in the region of the contacting, i.e. in the region in which the discharge conductor of the cathode of one cell is electrically in contact with the discharge conductor of the anode of the other cell.

Preferred materials of the respective are in this case copper or nickelized copper for the discharge conductor of the negative electrode and aluminum for the discharge conductor of the positive electrode.

The present invention will be explained in more detail with the aid of the following appended figures, without restricting the invention to the special embodiments referred to therein.

Several passive corrosion methods, which will be explained in more detail below, have proven to be particularly effective methods for treatment of the cells against contact corrosion:

DESCRIPTION OF THE INVENTION

Figure 3:
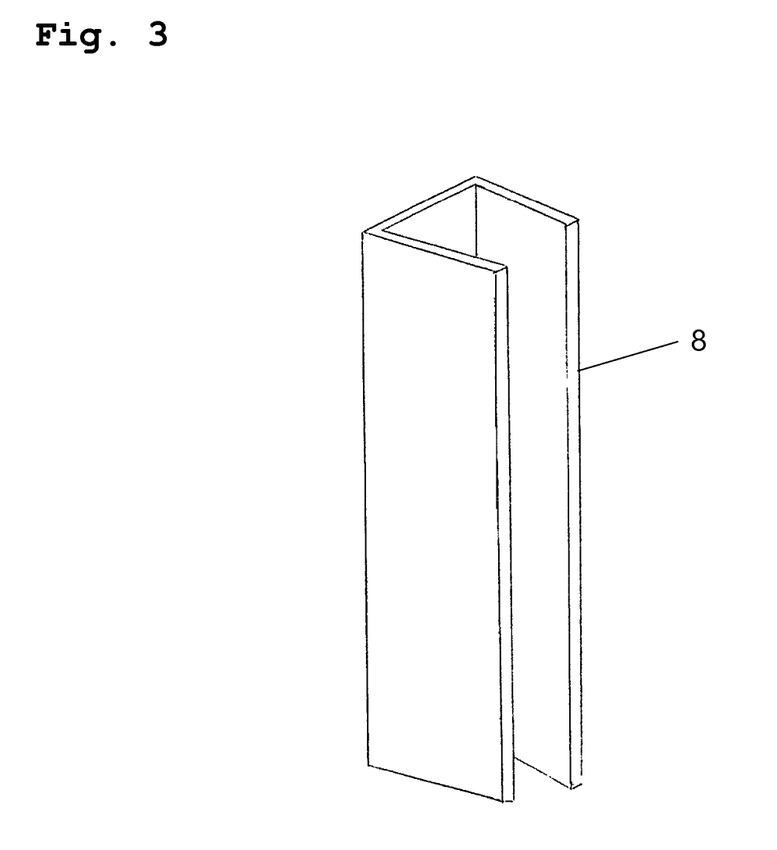
FIG. 3 is a perspective view of a connection clip.
Figure 4A:
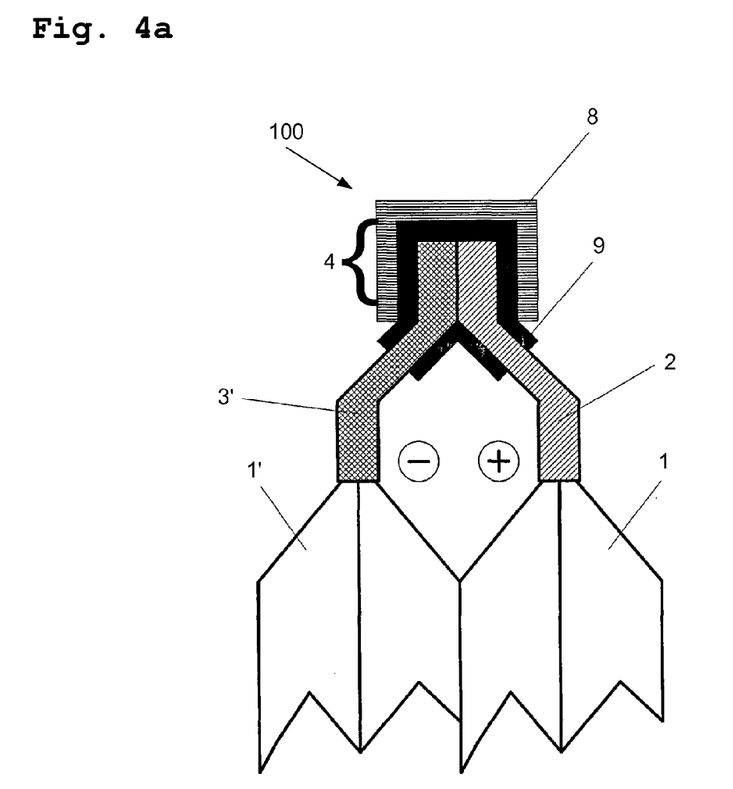
FIGS. 4a and 4b are partial sectional views showing an embodiment according to the invention.
Figure 4B:
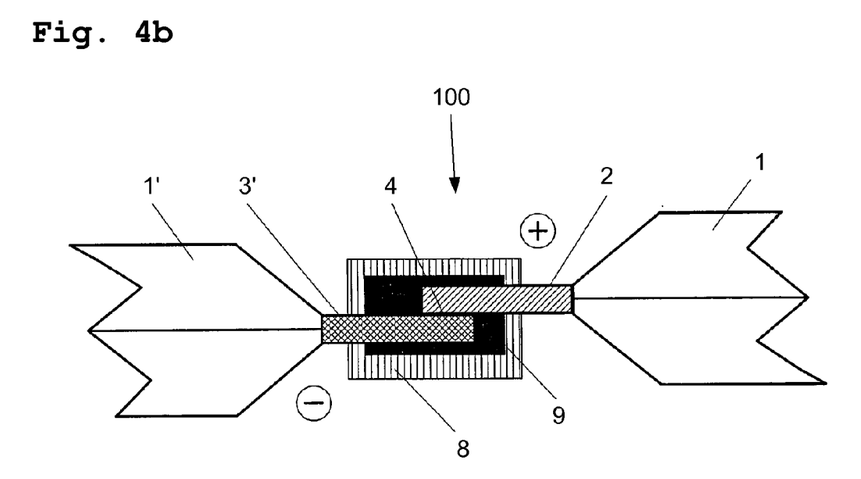

1) Protection of the Discharge Conductors by Plastic Clips (See FIGS. 3, 4)

One possibility is to use plastic clips 8 (see FIG. 3). The plastic clips 8 are adhesively bonded to the discharge conductors (=electrodes 2, 3), in which case different adhesive bonding techniques and adhesive bonding materials 9 may also be employed in this case. The combination of mechanical strength (compared with pure coatings) and relatively easy mounting, as well as low material use, distinguish this variant as particularly favorable and easy to apply.

FIG. 4a) represents an embodiment according to the invention of a lithium ion battery 100, which is based on the series-interconnected lithium ion cells known from the prior art, which are represented in FIG. 2a). In contrast to the embodiment represented in FIG. 2a), the battery 100 here having no corrosion protection in the region of the contacting 4, a plastic clip 8 is applied over an encapsulation compound 9, for example an epoxy resin, as corrosion protection on the region 4 in which the discharge conductors 2 and 3' are contacted with one another. This embodiment represents a spatially parallel arrangement of two cells 1 and 1', which are interconnected in series with one another. An alternative embodiment to this is represented in FIG. 4b). Here, in a similar way as previously in FIG. 2b), a spatially opposite arrangement of the individual cells 1 and 1' is represented. In the region of the connection 4 of the two discharge conductors (positive electrode-cathode 2 of the cell 1 and negative electrode-anode 3' of the cell 1'), the battery 100 according to the invention in this case has a plastic clip 8 which is connected to the point 4 via a protective coating layer 9, so that hermetic sealing of the contact point 4 takes place here.

Possible adhesives 9 for fastening such clips 8 on the cell discharge conductors 2, 3' may be universal adhesives, epoxy resin-based adhesives, 2-component adhesives or similar adhesives which effectively prevent infiltration by moisture. The sealing of the discharge conductors 2, 3' may likewise be carried out by means of protective coatings 9 or by encapsulation 9. Possible encapsulation materials are, for example, epoxy resins, polyurethane resins, butyl and silicone rubber or the like.

Figure 5A:
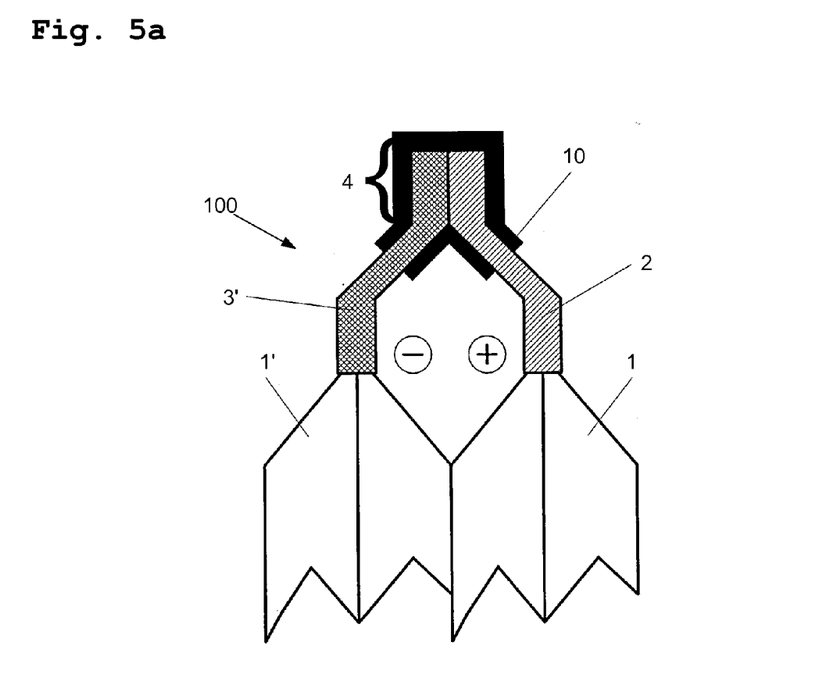
FIGS. 5a and 5b are similar views of an alternative embodiment according to the invention.
Figure 5B:
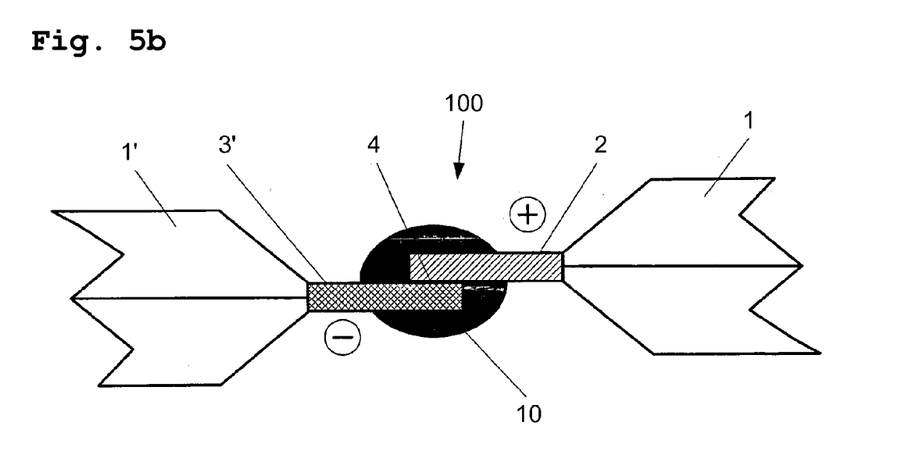

2) Protection of the Discharge Conductors by Protective Coatings, Epoxy Resins, Polyurethane Resins, Butyl and Silicone Rubber (See FIGS. 5a) and 5b))

Another possibility for protecting the discharge conductors consists in coating 10 of the points at risk, in particular at the points where the discharge conductors are welded (region 4). In the present examples (FIGS. 5a and 5b), the coating 10 is represented. The protection may be carried out by spray-coating, layer application or similar technical possibilities. The remaining regions of the cells 1, 1', on which there is no risk of contact corrosion, are not covered with coating so as to avoid impairing the dissipation of heat.

The invention claimed is:

1. A battery, comprising:
   at least two individual cells that are connected in series and each having a cathode and an anode;
   each of said at least two individual cells, for contacting, having at least one discharge conductor connected to said cathode and at least one discharge conductor connected to said anode, said discharge conductors being formed from mutually different metals; and
   said discharge conductors having at least a portion with passive corrosion protection;
   wherein said passive corrosion protection includes one or more configurations selected from the group consisting of:
   a) a clip formed from a nonmetallic material;
   b) a coating of a nonmetallic material; and
   c) a conversion layer being a nonmetallic layer.

2. The battery according to claim 1, wherein said nonmetallic material of said clip and said nonmetallic material of said coating is selected from the group consisting of lacquers, rubber, and plastics.

3. The battery according to claim 1, wherein said conversion layer is one or more layers selected from the group consisting of electrolytic oxidation of aluminum (eloxal) layers, hard eloxal layers, chromatizations, phosphate layers, iron oxides, and anodization layers.

4. The battery according to claim 1, wherein said passive corrosion protection is applied directly onto said discharge conductors.

5. The battery according to claim 1, wherein said passive corrosion protection is glued onto said discharge conductors by way of an adhesive layer.

6. The battery according to claim 5, wherein said adhesive of said adhesive layer is selected from the group consisting of a universal adhesive, a two-component adhesive, a physically bonding adhesive, a chemically curing adhesive, and a pressure-sensitive adhesive.

7. The battery according to claim 6, wherein said adhesive of said adhesive layer is selected from the group consisting of wet-tack adhesives containing solvent, epoxy resin adhesives, silicones, and cyanoacrylate adhesives.

8. The battery according to claim 1, wherein said passive corrosion protection hermetically seals the discharge conductor connected to said anode and the discharge conductor connected to said cathode.

9. The battery according to claim 1, wherein said passive corrosion protection is formed over an entirety of said discharge conductors.

10. The battery according to claim 1, wherein said passive corrosion protection is formed only in the contact region.

11. The battery according to claim 1, wherein said nonmetallic material of said coating is selected from the group of materials consisting of protective coatings, epoxy resins, polyurethane resins, butyl rubbers, and silicone rubbers.

12. The battery according to claim 1, wherein said negative electrode of said individual cells contains lithium ions.

13. The battery according to claim 1, wherein said nonmetallic material of said coating is selected from the group consisting of lacquers, rubber, and plastics.

14. The battery according to claim 1, wherein said passive corrosion protection includes the clip.

15. The battery according to claim 1, wherein said passive corrosion protection includes the conversion layer.

16. The battery according to claim 1, wherein said passive corrosion protection includes the coating.

\* \* \* \* \*